United States Patent

[11] 3,615,408

| [72] | Inventor | Charles M. Taubman |
| | | Cook County, Ill. |
| [21] | Appl. No. | 783,742 |
| [22] | Filed | Dec. 13, 1968 |
| [45] | Patented | Oct. 26, 1971 |
| [73] | Assignee | De Soto, Inc. |
| | | Des Plaines, Ill. |

[54] POLYMERIC QUATERNARY DERIVATIVES OF 4-VINYL PYRIDINE IN ELECTRICALLY CONDUCTIVE PAPER
7 Claims, No Drawings

[52] U.S. Cl.................................................. 96/1.5,
117/154, 117/201, 162/138
[51] Int. Cl.................................................. G03g 5/00,
D21h 1/10, C09d 5/24
[50] Field of Search........................................ 96/1.5;
117/154, 201; 162/138

[56] References Cited
UNITED STATES PATENTS

| 3,011,918 | 12/1961 | Silvernail et al. | 117/201 |
| 3,248,279 | 4/1966 | Geyer | 162/138 |
| 3,034,925 | 5/1962 | De Marco et al. | 117/121 |
| 3,245,833 | 4/1966 | Trevoy | 117/201 |

*Primary Examiner*—George F. Lesmes
*Assistant Examiner*—M. B. Wittenberg
*Attorney*—Dressler, Goldsmith, Clement & Gordon ABSTRACT: Quaternary polymers of 4-vinyl pyridine are used to render paper electrically conductive and therefore useful to receive photoconductive coatings to produce electrostatic copy paper.

POLYMERIC QUATERNARY DERIVATIVES OF 4-VINYL PYRIDINE IN ELECTRICALLY CONDUCTIVE PAPER

The present invention relates to the treatment of paper in order to render the same conductive and therefore useful to receive photoconductive coatings in the production of electrostatic copy paper.

Various material have been used to render paper conductive for this purpose such as ionic salts, humectants and polyelectrolytes with varying degrees of success since a good conductive treatment must satisfy difficult electrical and visual performance requirements, e.g., high conductivity for rapid discharge of electrostatic charge when the photoconductive coating is exposed to light and good print quality when the photoconductive coated paper is exposed and then toned with the usual toner used in electrofax-type xerographic processes.

The invention relies upon certain cationic polyelectrolytes which are obtained by quaternizing and polymerizing certain monomeric unsaturated heterocyclic amines, which are derivatives of 4-vinyl pyridine. These quaternary polymers uniquely satisfy all the electrical and visual requirements though, curiously, this is not true of polymers derived from closely related vinyl pyridines, e.g., 2-methyl-5-vinyl pyridine or 2-vinyl pyridine.

While the cationic polyelectrolytes of this invention are primarily useful as conductive treatments for electrostatic copy paper, they possess other utilities such as flocculation aids, detergent components and sequestrants.

In accordance with the invention 4-vinyl pyridine or less desirably, a halo, e.g., chloro or lower alkyl ($C_1$–$C_4$) substituted 4-vinyl pyridine is quaternized by reaction with an alkylating agent such as benzyl chloride, methyl chloride, dimethyl sulfate and the like (a well-known class of compounds). The quaternized monomer is not readily isolatable per se because it polymerizes either simultaneous with quaternization or subsequent thereto (it is believed the reactions are sequential, but in practice they both occur at the same time). The reaction is conducted in the liquid phase at temperatures in the range of 0°–200° C. and at pressures which maintain the liquid phase. Indeed, pressures of about 75 p.s.i. are required with the preferred alkylating agent, methyl chloride. The reaction is reasonably complete in 2–8 hours at the typical reaction temperatures of 40°–100° C. The reaction is desirably carried out in solution in either water of mixtures of water with water-miscible organic solvents such as acetone, methanol, dioxane, 2-ethoxy ethanol and the like. A typical concentration is 10–90 percent solids, but more usual is 40–70 percent. It is preferred to employ water containing 2–30 percent, preferably 3–15 percent, of solvent since this speeds the reaction.

The proportion of alkylating agent is molar or greater and, while some alkylating agents are effective without external heat, the preferred agent, methyl chloride, is favored by a temperature of at least 40°–50° C. The methyl chloride can be added all at once or in increments, the latter being preferred to limit the pressure in the system.

The product is a cationic water-soluble quaternary polymer which is obtained in aqueous solution. The product is usually a clean bright red or brown solution, though a slight haze may be encountered from time to time, e.g., when too much water-miscible organic solvent such as acetone is used. The products are polymers of relatively low molecular weight, e.g., typical products made by the preferred procedure of this invention have a molecular weight of 19,000–20,000 measured by membrane osmometric technique.

The solution of polymer is then preferably modified so that it will possess better holdout properties when paper is impregnated therewith, though such treatment is not needed. The holdout properties can be modified by using thickening agents such as carboxy methyl cellulose, clays, cationic starch and the like which thicken the aqueous solution.

Typical concentration of the solution which is applied may vary broadly, a 50 percent by weight polymer solution being usually mixed with a corresponding weight of an aqueous starch solution.

The modification of the paper is by simple impregnation and drying, the impregnating solution being applied to either one or both sides, but preferably to both sides.

The invention is illustrated in the examples which follow.

EXAMPLE 1

Preparation of Polymeric Methyl (4-vinyl pyridinium) Chloride

To a stirred Parr pressure vessel equipped with heater, thermocouple well, pressure gauge (0–2,000 p.s.i.), and gas inlet valve is added 625 g. of deionized water, 63 g. of acetone and 375 g. of 4-vinyl pyridine. The mixture is stirred and sparged with nitrogen for 10 minutes. The nitrogen sparge is stopped, the reactor is sealed and 198 g. (10 percent molar excess) of methyl chloride is added to the reactor. At approximately room temperature the pressure in the reactor is 70 p.s.i. gauge. The reactor is slowly heated to 75° C. and held at this temperature for 6 hours. The maximum pressure reached at 75° C. is 150 p.s.i. gauge and the pressure drops at the end of the reaction to approximately 100 p.s.i. gauge. The reactor is then opened and the slightly viscous red polymer solution is poured and has the following characteristics. Nonvolatile 43.5 percent, Brookfield viscosity of 48 c.p.s. (determined with No. 1 spindle at 50 r.p.m.), and an inorganic chloride content of 6.112 meg/g. (96 percent of theory—determined by a Mohr titration with $AgNO_3$).

EXAMPLE 2

To prepare a suitable coating solution or dispersion for electrophotographic paper the conductive polymer may be mixed with a suitable thickening agent to prevent excessive absorption of the coating into the paper (holdout treatment). Usually, the thickening agent is starch or a modified starch. A dispersion, generally aqueous, of approximately 20 percent nonvolatile resin solids is prepared of the conductive polymer and thickening agent in a ratio of from one to three parts conductive polymer for every part thickening agent. A coating solution for this example is formulated using the polymer solution of example 1 to provide two parts of conductive polymer solids and an aqueous starch solution to provide one part of starch with the mixture being adjusted with water to 20 percent nonvolatile resin solids. A suitable base paper is then coated on both sides with wire-wound rods. The rheology and the size of the wire-wound rod is adjusted, as known by those skilled in the art, to obtain a weight of the conductive coating on the paper of from 0.5 to 1 lb./ream (3,000 sq. ft.) per side. The paper is then dried and conditioned under constant humidity conditions for a period of 16 to 24 hours. Two humidity ranges are usually chosen for testing, 13–15 percent R.H. and 40–50 percent R.H. After conditioning the samples are tested for both surface and volume current, in their respective environments by the use of a electrode and electrometer apparatus with voltages in the range to 100 to 300 volts. The resistivities can then be calculated.

To illustrate the unexpected results obtained from the polymeric 4-vinyl pyridine quaternaries comparison was made with a commercial pyridine polyquaternary based on methyl (2-methyl 5-vinyl pyridinium) chloride and with a commercial conductive polymer based on poly vinyl benzyltrimethyl ammonium chloride.

At the low humidity range, which is the most critical range for a conductive treatment, the commercial pyridinium polymer based on methyl (2-methyl 5-vinyl pyridinium) chloride showed very poor resistivity. The polymer 4-vinyl pyridine quaternary of example 1 was comparable to the commercial conductive polymer in resistivity at low humidity. The conductive papers were also tested for print development after coating with a zinc oxide photoconductive coating. The commercial pyridinium polymer gave poor prints while the 4- vinyl pyridinium polymer of example 1 yielded prints comparable in every respect to the commercial conductive polymer control.

While application of the quaternary polymer to paper by way of aqueous solution has been used as illustrative, and is preferred, it is also permissible to completely replace the water in the solution with organic solvents, such as methanol, or to apply the quaternary polymer in the form of a viscous liquid in the absence of any solvent since the low molecular weight polymers which may be formed and used in the invention can vary from viscous liquids to tacky solids.

The invention is defined in the claims which follow.

I claim:

1. Electrically conductive paper consisting essentially of paper impregnated with a quaternary cationic water-soluble polymer of 4-vinyl pyridine or a halo or lower alkyl substituted 4-vinyl pyridine.

2. Electrically conductive paper as recited in claim 1 in which said quaternary polymer is applied in an aqueous solution.

3. Electrically conductive paper as recited in claim 1 in which said quaternary polymer is obtained by reacting said 4-vinyl pyridine or substitution product thereof with an alkylating agent in aqueous medium.

4. Electrically conductive paper as recited in claim 3 in which 4-vinyl pyridine is reacted with at least a molar proportion of methyl chloride in an aqueous medium containing 2–30 percent by weight of water-miscible organic solvent.

5. Electrically conductive paper as recited in claim 4 in which the reaction is conducted at a temperature in the range of 40°–100° C.

6. Electrically conductive paper as recited in claim 1 in which said paper is impregnated with an aqueous medium containing said quaternary polymer is solution and thickened with a thickening agent.

7. Electrostatic copy paper comprising an electrically conductive paper as recited in claim 1 having a surface thereof coated with a photoconductive coating.